US 9,116,338 B2

(12) United States Patent
Yano

(10) Patent No.: US 9,116,338 B2
(45) Date of Patent: Aug. 25, 2015

(54) HALF MIRROR AND IMAGE DISPLAY APPARATUS

(71) Applicant: Seiko Epson Corporation, Tokyo (JP)

(72) Inventor: Kunihiko Yano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 99 days.

(21) Appl. No.: 13/681,715

(22) Filed: Nov. 20, 2012

(65) Prior Publication Data

US 2013/0135747 A1  May 30, 2013

(30) Foreign Application Priority Data

Nov. 24, 2011  (JP) ................................ 2011-256682

(51) Int. Cl.
| G02B 27/14 | (2006.01) |
| G03H 1/00 | (2006.01) |
| G02B 1/10 | (2015.01) |
| G02B 5/26 | (2006.01) |
| G02B 27/01 | (2006.01) |
| G02B 5/08 | (2006.01) |

(52) U.S. Cl.
CPC .......... G02B 27/0101 (2013.01); G02B 27/142 (2013.01); G02B 27/144 (2013.01); *G02B 5/0808* (2013.01); *G02B 27/0172* (2013.01); *G02B 2027/0194* (2013.01)

(58) Field of Classification Search
CPC .......... G02B 27/0101; G02B 27/0172; G02B 5/0808; G02B 2027/0194; G03C 17/3642; G03C 17/3663
USPC ........................ 359/13–14, 839, 586, 629–633
See application file for complete search history.

(56) References Cited

U.S. PATENT DOCUMENTS

| 3,559,090 | A | | 1/1971 | Refermat et al. |
| 4,179,181 | A | * | 12/1979 | Chang ........................... 359/360 |
| 4,367,921 | A | * | 1/1983 | Sawamua et al. ............. 359/586 |
| 6,219,188 | B1 | * | 4/2001 | Tsukamoto ................... 359/629 |
| 6,262,847 | B1 | * | 7/2001 | Tsukamoto ................... 359/584 |
| 6,535,336 | B2 | * | 3/2003 | Tatsumi ........................ 359/584 |
| 6,939,018 | B2 | * | 9/2005 | Aihara et al. ................. 359/883 |
| 6,957,895 | B2 | * | 10/2005 | Sawamura et al. ........... 359/883 |

(Continued)

FOREIGN PATENT DOCUMENTS

| JP | 56-27106 A | 3/1981 |
| JP | 3563955 B | 9/1999 |

(Continued)

OTHER PUBLICATIONS

English Machine Translation of Japanese Patent to Okumura.*

*Primary Examiner* — Thomas K Pham
*Assistant Examiner* — Nicholas R Pasko
(74) *Attorney, Agent, or Firm* — ALG Intellectual Property, LLC

(57) ABSTRACT

There is provided an image display apparatus which enables an image displayed on a display device to be viewed through a half mirror. The half mirror includes two translucent resin substrates formed from resin, a metallic film composed Ag and disposed between the resin substrates, and dielectric films disposed between the metallic film and the resin substrates, respectively. Each of the dielectric films includes an $SiO_2$ layer provided on the corresponding one of the substrates, an $Al_2O_3$ layer provided on the $SiO_2$ layer, and a $ZrO_2$ layer provided on the $Al_2O_3$ layer.

15 Claims, 8 Drawing Sheets

(56) References Cited

U.S. PATENT DOCUMENTS

| | | | |
|---|---|---|---|
| 7,311,961 B2* | 12/2007 | Finley et al. | 428/212 |
| 7,652,823 B2* | 1/2010 | Jidai et al. | 359/629 |
| 7,826,113 B2* | 11/2010 | Noda | 359/13 |
| 8,445,098 B2* | 5/2013 | Medwick et al. | 428/220 |
| 8,587,869 B2* | 11/2013 | Totani et al. | 359/630 |
| 2011/0075266 A1* | 3/2011 | Oka | 359/630 |
| 2011/0317233 A1* | 12/2011 | Hayashibe et al. | 359/201.2 |
| 2013/0083403 A1* | 4/2013 | Takagi et al. | 359/618 |

FOREIGN PATENT DOCUMENTS

| | | | | |
|---|---|---|---|---|
| JP | 2001-13308 A | | 1/2001 | |
| JP | 2001013308 A | * | 1/2001 | G02B 5/04 |

* cited by examiner

HALF MIRROR AND IMAGE DISPLAY APPARATUS

BACKGROUND

1. Technical Field

The present invention relates to a half mirror and an image display apparatus including the half mirror.

2. Related Art

In typical, image display apparatuses, such as head mount displays, head up displays, and viewfinders of camcorders, include half mirrors to split a luminous flux into a plurality of beams. In the optical system of an observation system included in an image-recording apparatus, a half mirror reflects light of an image displayed on a display device, such as a liquid crystal display device, to eyes of a viewer while transmitting the external light, so that the viewer can view both image information displayed on the display device and external light in one visual field.

Examples of such a half mirror include a prism-type beam splitter including transparent substrates bonded to each other. In the prism-type beam splitter, a thin film composed of metal such as Ag is formed on a surface of one transparent substrate, and the other transparent substrate having a refractive index the same as that of one transparent substrate is bonded to the topmost layer of the thin layer such that the thin film is interposed between the two transparent substrates, which enables transmitted light to directly travel and enables external distortion of a transmission image to be reduced.

Example of the thin film include a multilayered dielectric film including a high-refractive-index film and low-refractive-index film composed of dielectric materials and a structure including dielectric films and a metallic film interposed therebetween (see, U.S. Pat. No. 3,559,090). The latter, in which a metallic film is interposed between dielectric films, can reduce polarization dependence and incident angle dependence within a broad wavelength range being approximately entire visible light region and is therefore suitable for use in see-through optical systems which enable image information to be displayed while allowing observation of transmitted external light.

Another metal, such as Al, may be used in place of Ag to form the thin film used in a half mirror; however, a problem of large optical loss by absorption is caused, and it is difficult to precisely and uniformly form a significantly thin layer having a thickness of 1 to 5 nm. The thin Ag film also has a problem in which Ag is readily allowed to react for degradation, such as diffusion by heat, granulation, and oxidation with a gas composition.

In typical, in order to suppress such reactivity of Ag, the film needs to be formed on a substrate kept at low temperature under high vacuum, and a protective layer needs to be formed to suppress degradation in air. In other known techniques, Ag is alloyed with a small amount of a stabilizer without impairing the optical properties of Ag, or an adjacent metallic layer composed of, for example, Cr is formed so as to have a slightly thin thickness for the purpose of stable film formation as is disclosed in Japanese Patent No. 3563955.

In display apparatuses, however, a resin substrate is used to form a prism in some cases because of demands for reductions in the weight of an optical component and its production cost. The resin substrate has particular water absorbability and contains unstable molecules, and moisture and organic components are therefore leaked from the resin substrate and then volatilized to be taken into the film during film formation under vacuum. Thus, density of the Ag layer and the dielectric films with the Ag layer interposed therebetween is reduced, which problematically causes diffusion or degradation in the Ag layer with ease as compared with use of the traditional glass substrates.

SUMMARY

An advantage of some aspects of the invention is that a substrate of a half mirror is formed from a resin material to reduce the weight of an optical component and its production cost, which can reduce loss in quantity of light and stabilize the optical characteristics of a metallic film included in the half mirror.

In order to provide the above advantage, a first aspect of the invention provides a half mirror including a pair of resin substrates formed from translucent resin, a metallic film at least containing Ag and disposed between the resin substrates, and a pair of dielectric films disposed between the metallic film and the resin substrates, respectively, wherein each of the dielectric films includes a high-refractive-index layer and a block layer, the high-refractive-index layer being composed of $ZrO_2$ and configured so as to contact the metallic film, and the block layer being disposed between each of the substrates and the corresponding one of the high-refractive-index layers; and each of the block layers includes an $SiO_2$ layer provided on the corresponding one of the resin substrates and an $Al_2O_3$ layer provided on the $SiO_2$ layer.

In the first aspect of the invention, the metallic film composed of Ag is covered with the high-refractive-index layers composed of $ZrO_2$, which enables a high refractive index to be securely exhibited. Furthermore, the block layers including the $SiO_2$ layers and the $Al_2O_3$ layers can sufficiently secure the distance between the resin substrates and the metallic film, respectively, and the $SiO_2$ layers highly adhesive to resin directly contact the resin substrates, which can prevent a reduction in the density of the dielectric layers with the metallic layer interposed therebetween, such a reduction in the density of the dielectric layers being caused by leakage of moisture and organic components from the resin substrates and the subsequent volatilization thereof during film formation.

In the half mirror of the first aspect, it is preferable that each of the dielectric films further includes a protective film disposed between corresponding one of the resin substrates and the corresponding one of the block layers, the protective film being any one of a $ZrO_2$ layer, an $Al_2O_3$ layer, an $SiO_2$ layer, and a laminate of $ZrO_2$, $Al_2O_3$, and $SiO_2$. In this case, the protective layers composed of any one of $ZrO_2$, $Al_2O_3$, and $SiO_2$ or formed by laminating these materials are provided on the side of the resin substrates, which can secure a further appropriate refractive index and transmittance and further steadily prevent the resin substrates from typically degrading the metallic film.

In the half mirror of the first aspect of the invention, any one of an alloy of Zr and Ti and mixed oxide containing Zr and Ti may be used in place of $ZrO_2$. In this case, use of the alloy of Zr and Ti or the mixed oxide containing Zr and Ti can secure a higher refractive index.

A second aspect of the invention provides a half mirror including a pair of resin substrates formed from translucent resin, a metallic film at least containing Ag and disposed between the resin substrates, and a pair of dielectric films disposed between the metallic film and the resin substrates, respectively, wherein each of the dielectric films includes a high-refractive-index layer and a block layer, the high-refractive-index layer being composed of $Al_2O_3$ and configured so as to contact the metallic film, and the block layer being disposed between each of the substrates and the corresponding one of the high-refractive-index layers; and each of the block layers includes an $SiO_2$ layer provided on the corresponding one of the resin substrates and a $ZrO_2$ layer provided on the $SiO_2$ layer.

In the second aspect of the invention, the metallic film composed of Ag is covered with the high-refractive-index layers composed of $Al_2O_3$, which enables a high refractive index to be securely exhibited. Furthermore, the $SiO_2$ layers highly adhesive to resin directly contact the resin substrates, which can prevent a reduction in the density of the dielectric layers with the metallic layer interposed therebetween, such a reduction in the density of the dielectric layers being caused by leakage of moisture and organic components from the resin substrates and the subsequent volatilization thereof during film formation.

A third aspect of the present invention provides a half mirror including a pair of resin substrates formed from translucent resin, a metallic film at least containing Ag and disposed between the resin substrates, and first and second dielectric films disposed between the metallic film and the resin substrates, respectively, wherein the first dielectric film includes a high-refractive-index layer and a block layer, the high-refractive-index layer being composed of $Al_2O_3$ and configured so as to contact the metallic film, and the block layer being disposed between one of the resin substrates and the high-refractive-index layer and including an $SiO_2$ layer provide on the resin substrate and an $Al_2O_3$ layer provided on the $SiO_2$ layer; and the second dielectric film includes a high-refractive-index layer and a block layer, the high-refractive-index layer being composed of $ZrO_2$ and configured so as to contact the metallic film, and the block layer including an $Al_2O_3$ layer provided on the other one of the resin substrates so as to be disposed between the resin substrate and the high-refractive-index layer.

In the third aspect of the invention, the metallic film composed of Ag is covered with the high-refractive-index layers composed of $Al_2O_3$ and $ZrO_2$ in the first and second dielectric films, respectively, which enables a high refractive index to be securely exhibited. Furthermore, in the first and second dielectric films, the $SiO_2$ and $Al_2O_3$ layers highly adhesive to resin directly contact the resin substrates, respectively, and the block layers sufficiently secures the distance from the resin, which can prevent a reduction in the density of the dielectric layers with the metallic layer interposed therebetween, such a reduction in the density of the dielectric layers being caused by leakage of moisture and organic components from the resin substrates and the subsequent volatilization thereof during film formation.

In the half mirror of any of the second and third aspects, it is preferable that each of the dielectric films further includes a protective film disposed between corresponding one of the resin substrates and the corresponding one of the block layers, the protective film being any one of a $ZrO_2$ layer, an $Al_2O_3$ layer, an $SiO_2$ layer, and a laminate of $ZrO_2$, $Al_2O_3$, and $SiO_2$. In this case, the protective layers composed of any one of $ZrO_2$, $Al_2O_3$, and $SiO_2$ or formed by laminating these materials are provided on the side of the resin substrates, which can secure a further appropriate refractive index and transmittance and further steadily prevent the resin substrates from typically degrading the metallic film.

In the half mirror of any of the second and third aspects, any one of an alloy of Zr and Ti and mixed oxide containing Zr and Ti may be used in place of $ZrO_2$. In this case, use of the alloy of Zr and Ti or the mixed oxide containing Zr and Ti can secure a higher refractive index.

In the half mirror of any of the first to third aspects, it is preferable that the $Al_2O_3$ layers have a thickness of not less than 5 nm, and the dielectric films have a thickness ranging from 200 nm to 1 μm. If the pair of dielectric films have a thickness higher than 1 μm, the films are cracked and separated because of a difference in a coefficient of linear expansion between the films and the resin substrates, whereas the dielectric films having an appropriate thickness of 200 nm to 1 μm can secure the distance between the resin substrates and the metallic film, respectively, and prevent the resin substrates from typically degrading the metallic film.

A fourth aspect of the invention provides an image display apparatus including a display device to display an image and the half mirror having any of the above-described advantages, wherein the half mirror transmits external light and reflects the image displayed on the display device to show the external light and the image combined with each other.

In the image display apparatus according to the fourth aspect of the invention which enables an image displayed on the display device, such as a liquid crystal display device, to be observed through the half mirror, the resin substrates of the half mirror are formed from a resin material, which can reduce the weight of an optical component and its production cost. Furthermore, the metallic film of the half mirror is composed of Ag, so that loss in quantity of light can be reduced and the block layers and protective layers of the dielectric films with the metallic film interposed therebetween can enhance durability and thermal stability over a long period of time to provide stable optical characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
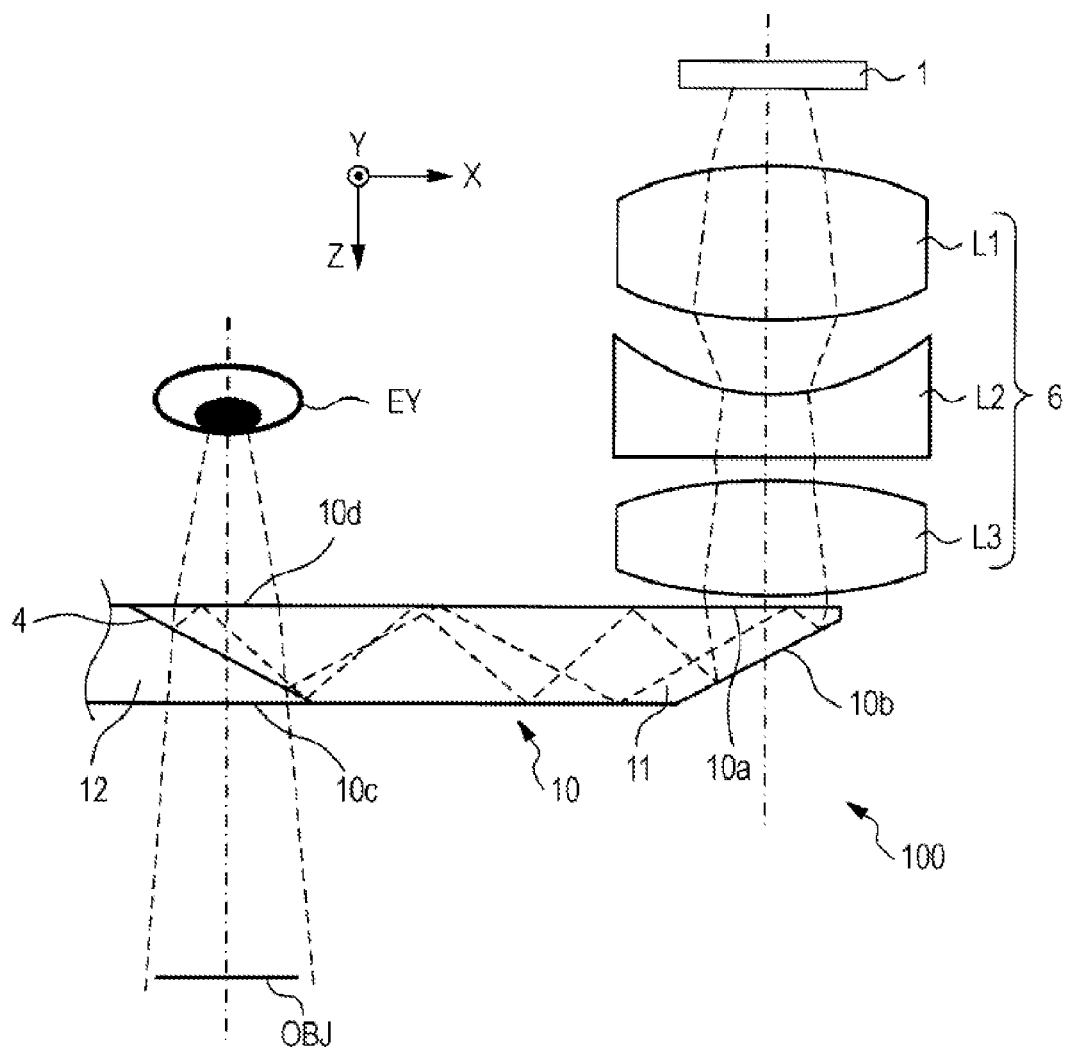
FIG. 1 is a partial cross-sectional view illustrating an optical path in a head mount display (HMD) of an embodiment of the invention.

A head mount display (hereinafter referred to as HMD) of an embodiment of the invention will now be described in detail with reference to the accompanying drawings. In the drawings, sizes of components are appropriately changed as compared with the actual sizes thereof. Since the HMD to be described is merely an embodiment of the invention, the invention should not be limited thereto, and the HMD can be appropriately modified within the scope of the invention.

FIG. 1 is a partial cross-sectional view illustrating an optical pass in an HMD 100 of an embodiment of the invention. As illustrated in FIG. 1, the HMD 100 is an image display apparatus which shows an image displayed on a display device 1, such as a liquid crystal display device, in front of an eye of a viewer such that the viewer can see it. The HMD 100 is set on the head of a viewer, and various devices are incorporated in an HMD body to be disposed in front of an eye EY of the viewer. The HMD body is a housing to be disposed in front of an eye of a user and is provided with the display device 1, an optical system 6, and a light guide unit 10 which are each accommodated in the housing. The front side of the housing being the HMD body is opened or provided with a transparent component such as glass.

In this embodiment, the display device 1 is a transmissive liquid crystal panel, and image light emitted from the display device 1 passes the optical system 6 and then enters an image entrance plane 10a of the light guide unit 10. The optical system 6 is a group of lenses which magnify light emitted from the display device 1 to enable the light to enter the image entrance plane 10a of the light guide unit 10. In this embodiment, the optical system 6 includes an objective lens L1 disposed in front of the display device 1, an adjustment lens L2 for adjustment, and a condenser lens L3 to concentrate light toward the light guide unit 10. In the case where a scale of an image does not need to be changed depending on the size of the display device 1, the optical system 6 may not be provided. Although not illustrated, various optical components are provided between the display device 1 and the light guide unit 10 depending on optical requirements of the HMD 100, such as a light-guiding medium, e.g., air, a transparent plastic member, or glass; or another lens.

The light guide unit 10 is a beam splitter and disposed in front of the eye EY of a viewer to combine a light beam reflected by an external object OBJ and a light beam emitted from the display device 1, and the combined light beams enter the eye EY. Specifically, the light guide unit 10 includes a half mirror 4 incorporated therein and has an external light entrance plane 10c through which external light passes, the image entrance plane 10a through which light emitted from the display device 1 passes, a reflection plane 10b which reflects light which has passed through the image entrance plane 10a, and an emission plane 10d from which a light beam produced by combining external light and light reflected by the reflection plane 10b is emitted.

The light guide unit 10 includes two resin substrates 11 and 12 formed from transparent resin, and the half mirror 4 is provided along the bonded surfaces of the two resin substrates 11 and 12. Examples of the material of the resin substrates 11 and 12 include an acrylic material, urethane, polycarbonate, cycloolefin, and styrene, and each may be alone or in combination.

The half mirror 4 transmits external light which has passed through the external light entrance plane 10c and reflects light which has been emitted from the display device 1 and then reflected by the reflection plane 10b. In particular, a luminous flux (visible luminous flux) from an image displayed on the display device 1 enters the image entrance plane 10a through the optical system 6 and is then totally reflected by the reflection plane 10b, and then this luminous flux is reflected by the half mirror 4 and guided to the eye EY of a viewer through the emission plane 10d. In the half mirror 4, an image of the object OBJ being scenery is spatially superimposed on a virtual image from the display device 1, so that both the images can be observed in one visual field at the same visibility.

Figure 2A:
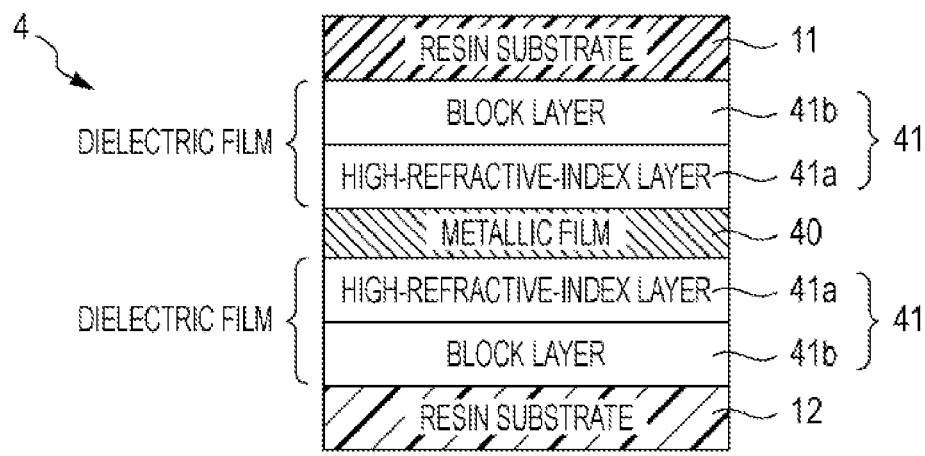
FIG. 2A is a schematic cross-sectional view illustrating a film configuration of a half mirror.
Figure 2B:
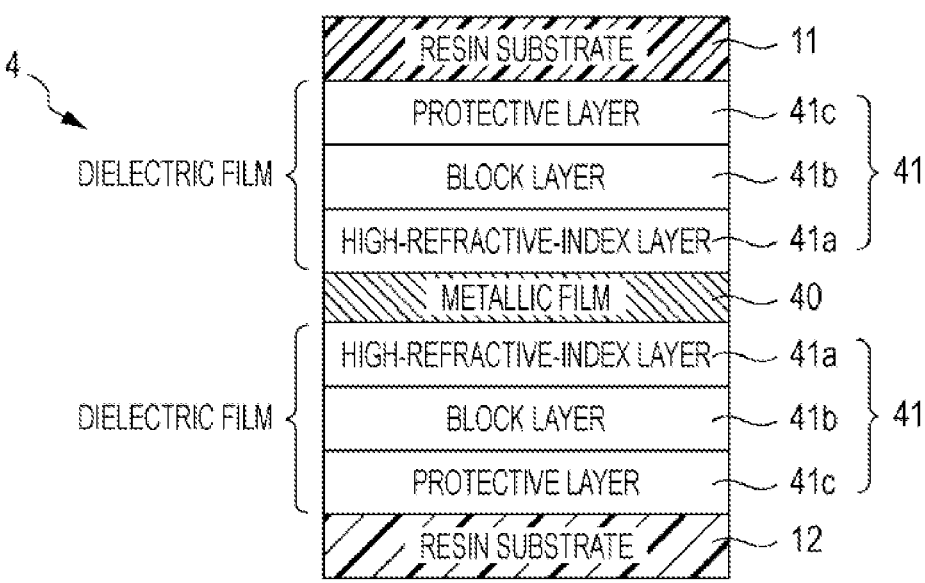
FIG. 2B is a schematic cross-sectional view illustrating the film configuration of FIG. 2A further including protective films.

FIGS. 2A and 2B are schematic cross-sectional views illustrating the configurations of the half mirror 4 in FIG. 1. With reference to FIG. 2A, the half mirror 4 schematically include the resin substrates 11 and 12, a pair of dielectric films 41 formed on surfaces of the resin substrates 11 and 12, respectively, and a metallic film 40 disposed between the dielectric films 41. In this embodiment, the metallic film 40 is composed of Ag. The metallic film 40 may be composed of an ally of Ag and another metal, such as copper, gold, or palladium, to enhance bonding strength (adhesion) of the metallic film 40 to the dielectric films 41 provided on the resin substrates 11 and 12, respectively, which leads to enhancements in thermal resistance, stability, and optical characteristics.

The dielectric films 41 include high-refractive-index layers 41a which form a pair and contact the upper and lower surfaces of the metallic film 40 and block layers 41b which contact the resin substrates 11 and 12, respectively. Materials of the high-refractive-index layers 41a and the block layers 41b can be selected from $SiO_2$, $Al_2O_3$, $ZrO_2$, $TiO_2$, mixed oxide containing Zr and Ti, mixed oxide containing La and Ti, mixed oxide containing La and Al, $CeO_2$, $Ta_2O_5$, $HfO_2$, and a mixture thereof, each being used alone or in combination.

Specifically, the high-refractive-index layers 41a are primarily composed of $ZrO_2$ or $TiO_2$ having a high refractive index and a low optical absorption property and configured so as to have a thickness which enables reflection inside the metallic layer 40 composed of Ag to be selectively reduced, so that spectral characteristics are flattened. The high-refractive-index layers 41a may be Zr-containing layers composed of an alloy of Zr and Ti or mixed oxide containing Zr and Ti, instead of $ZrO_2$ layers. Use of the alloy of Zr and Ti or mixed oxide containing Zr and Ti can contribute to securing a higher refractive index.

The block layers 41b are composed of any one of $ZrO_2$, $Al_2O_3$, and an oxide of silicon, such as SiO or $SiO_2$, or formed by laminating these materials. The material to be used for the block layers 41b exhibits high adhesion to the resin substrates 11 and 12 and enables deformation due to thermal expansion or hydroscopic expansion to be absorbed. Multiple materials may be laminated to form the block layers 41b, or, for example, $Al_2O_3$ layers may be formed so as to contact the resin layers 11 and 12. In the case where $Al_2O_3$ is used to form the block layers 41b, the $Al_2O_3$ layers have a thickness of not less than 5 nm. In addition, the pair of the dielectric films 41 each have a thickness ranging from 200 nm to 1 μm. The dielectric films 41 having such a thickness can sufficiently secure the distance between the resin substrates 11 and 12 and the metallic film 40, respectively, and prevent the resin substrates 11 and 12 from typically degrading the metallic film 40.

The dielectric films 41 may further include protective films 41c which are disposed between resin substrates 11 and 12 and the block layers 41b as illustrated in FIG. 2B, respectively, the protective films 41c being composed of any one of $ZrO_2$, $Al_2O_3$, and $SiO_2$ or formed by laminating these materials. The protective films 41c are provided on the side of the resin substrates 11 and 12, respectively, which can secure further appropriate reflectance and transmittance and further steadily prevent the resin substrates 11 and 12 from typically degrading the metallic film 40.

The dielectric films 41 illustrated in FIGS. 2A and 2B may be formed so as to have a difference in a film configuration between the upper side of the metallic film 40 and the lower side; in particular, the dielectric films 41 may be in the form of first and second dielectric films having different film configurations (composition and number of layers). Reflectance and transmittance of the entire film configuration may be adjusted depending on an image displayed by an image display apparatus and an incident direction or emission direction of external light.

Specific examples of the film configuration of the half mirror of the invention will now be described.

Example 1

The resin substrates 11 and 12 were formed from acrylic resin (refractive index n=1.50, the value of refractive index n is a representative value at a wavelength of 550 nm being the central wavelength of visible light), and 10 layers were formed from materials shown in Table 1 so as to have refractive indexes and thicknesses shown in Table 1.

TABLE 1

Substrate: acrylic resin (n = 1.50)
Angle of incident light: 20 to 34°

| Layer | Material | Refractive index | Thickness (nm) |
|---|---|---|---|
| 1 | $ZrO_2$ | 2.02 | 6.2 |
| 2 | $SiO_2$ | 1.46 | 169.4 |
| 3 | $Al_2O_3$ | 1.57 | 17.5 |
| 4 | $ZrO_2$ | 2.02 | 78.7 |
| 5 | Ag | 0.06 | 18.0 |
| 6 | $ZrO_2$ | 2.02 | 45.6 |
| 7 | $Al_2O_3$ | 1.57 | 17.5 |
| 8 | $SiO_2$ | 1.46 | 528.9 |
| 9 | $Al_2O_3$ | 1.57 | 16.3 |
| 10 | $SiO_2$ | 1.46 | 59.6 |
| Total: | | | 957.8 |

As shown in Table 1, in Example 1, the metallic film 40 (fifth layer) was an Ag film having a refractive index of 0.06 and a thickness of 18.0 nm, and the high-refractive-index layers 41a (fourth and sixth layers) were formed from $ZrO_2$ such that the metallic film 40 was disposed therebetween. Furthermore, first $Al_2O_3$ layers (third and seventh layers) were formed such that the above laminate was disposed therebetween, and $SiO_2$ layers (second and eighth layers) were formed such that the resulting laminate was disposed therebetween. Moreover, in Example 1, the protective layers 41c were formed such that the two $SiO_2$ layers were interposed therebetween. One of the protective films 41c was a single layer (first layer) composed of $ZrO_2$ and contacting one resin substrate, and the other one was a multilayer (ninth and tenth layers) including an $SiO_2$ layer contacting the other substrate and a second $Al_2O_3$ layer covering the $SiO_2$ layer.

The $Al_2O_3$ layers included in the block layers 41b had a thickness of not less than 5 nm, and the pair of dielectric films 41 had a thickness ranging from 200 nm to 1 μm. In other words, the total thickness of the first to fourth layers and the total thickness of the sixth to tenth layers were in the range of 200 nm to 1 μm.

Figure 3:
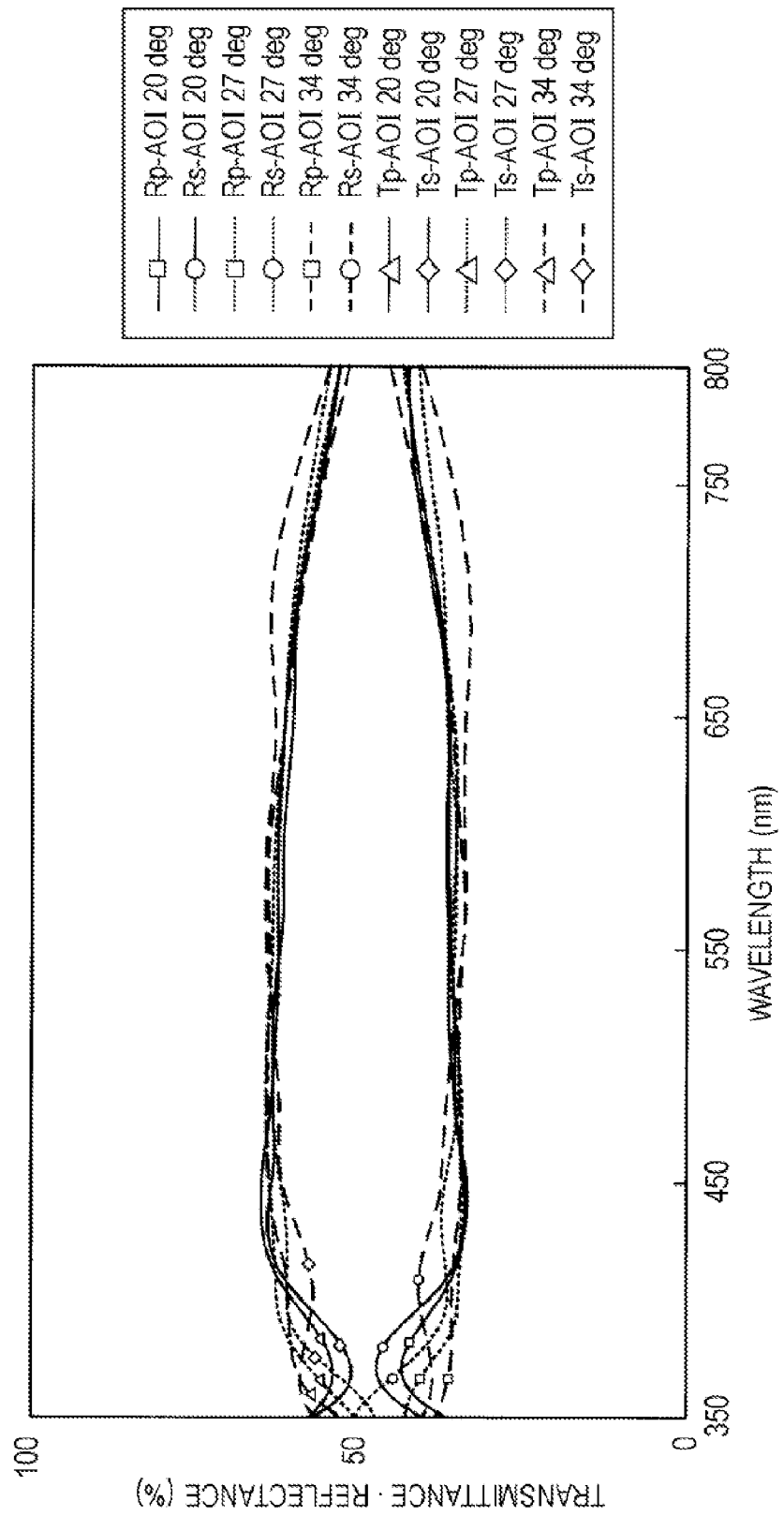
FIG. 3 is a graph illustrating a relationship of a refractive index R of a half mirror having a film configuration of Example 1 with a spectral transmittance T at an incident angle of 20 to 34°.

FIG. 3 is a graph illustrating a relationship of a refractive index R of a half mirror having the film configuration of Example 1 with a spectral transmittance T at an incident angle of 20 to 34°. FIG. 3 demonstrates that Example 1 provided flat spectral characteristics at a wavelength from 400 to 660 nm within a visible light range and exhibited a reflectance of 62.0%, a transmittance of 35.0%, and optical absorption of 3.0% at a wavelength of 550 nm, which indicates that the half mirror exhibited low optical absorption and had excellent optical characteristics.

In Example 1, the metallic film 40 composed of Ag was covered with the high-refractive-index layers 41a composed of $ZrO_2$, so that a high refractive index was able to be secured. Furthermore, the block layers 41b each including the $SiO_2$ layer and the $Al_2O_3$ layer were able to sufficiently secure the distances between the resin substrates 11 and the metallic film 40 and between the resin substrates 12 and the metallic film 40, respectively. The protective films 41c formed from $ZrO_2$ and formed by laminating $Al_2O_3$ and $SiO_2$ were additionally provided on the side of the resin substrates 11 and 12, respectively, which was able to secure a further appropriate refractive index and transmittance and further steadily prevent the resin substrates 11 and 12 from typically degrading the metallic film 40. In particular, the $ZrO_2$ layer and the $SiO_2$ layer which were highly adhesive to resin directly contacted the resin substrates 11 and 12, respectively, which was able to prevent a reduction in the density of the dielectric films 41 with the metallic layer 40 interposed therebetween, the reduction in the density of the dielectric films 41 being caused by leakage of moisture and organic components from the resin substrates 11 and 12 and the subsequent volatilization thereof during film formation.

Example 2

The resin substrates 11 and 12 were formed from acrylic resin (refractive index n=1.50), and 7 layers were formed from materials shown in Table 2 so as to have refractive indexes and thicknesses shown in Table 2.

TABLE 2

Substrate: acrylic resin (n = 1.50)
Angle of incident light: 20 to 34°

| Layer | Material | Refractive index | Thickness (nm) |
|---|---|---|---|
| 1 | $SiO_2$ | 1.46 | 162.9 |
| 2 | $Al_2O_3$ | 1.57 | 17.5 |
| 3 | $ZrO_2$ | 2.02 | 80.3 |
| 4 | Ag | 0.06 | 17.9 |
| 5 | $ZrO_2$ | 2.02 | 43.8 |
| 6 | $Al_2O_3$ | 1.57 | 17.5 |
| 7 | $SiO_2$ | 1.46 | 161.8 |
| Total: | | | 501.8 |

As shown in Table 2, in Example 2, the metallic film 40 (fourth layer) was an Ag film having a refractive index of 0.06 and a thickness of 17.9 nm, and the high-refractive-index layers 41a (third and fifth layers) were formed from $ZrO_2$ such that the metallic film 40 was disposed therebetween. Furthermore, $Al_2O_3$ layers (second and sixth layers) were formed such that the above laminate was disposed therebetween, and then $SiO_2$ layers (first and seventh layers) were formed such that the resulting laminate was disposed therebetween, thereby forming the block layers 41b.

The $Al_2O_3$ layers included in the block layers 41b had a thickness of not less than 5 nm, and the pair of dielectric films 41 had a thickness ranging from 200 nm to 1 μm. In other words, the total thickness of the first to third layers and the total thickness of the fifth to seventh layers were in the range of 200 nm to 1 μm.

Figure 4:
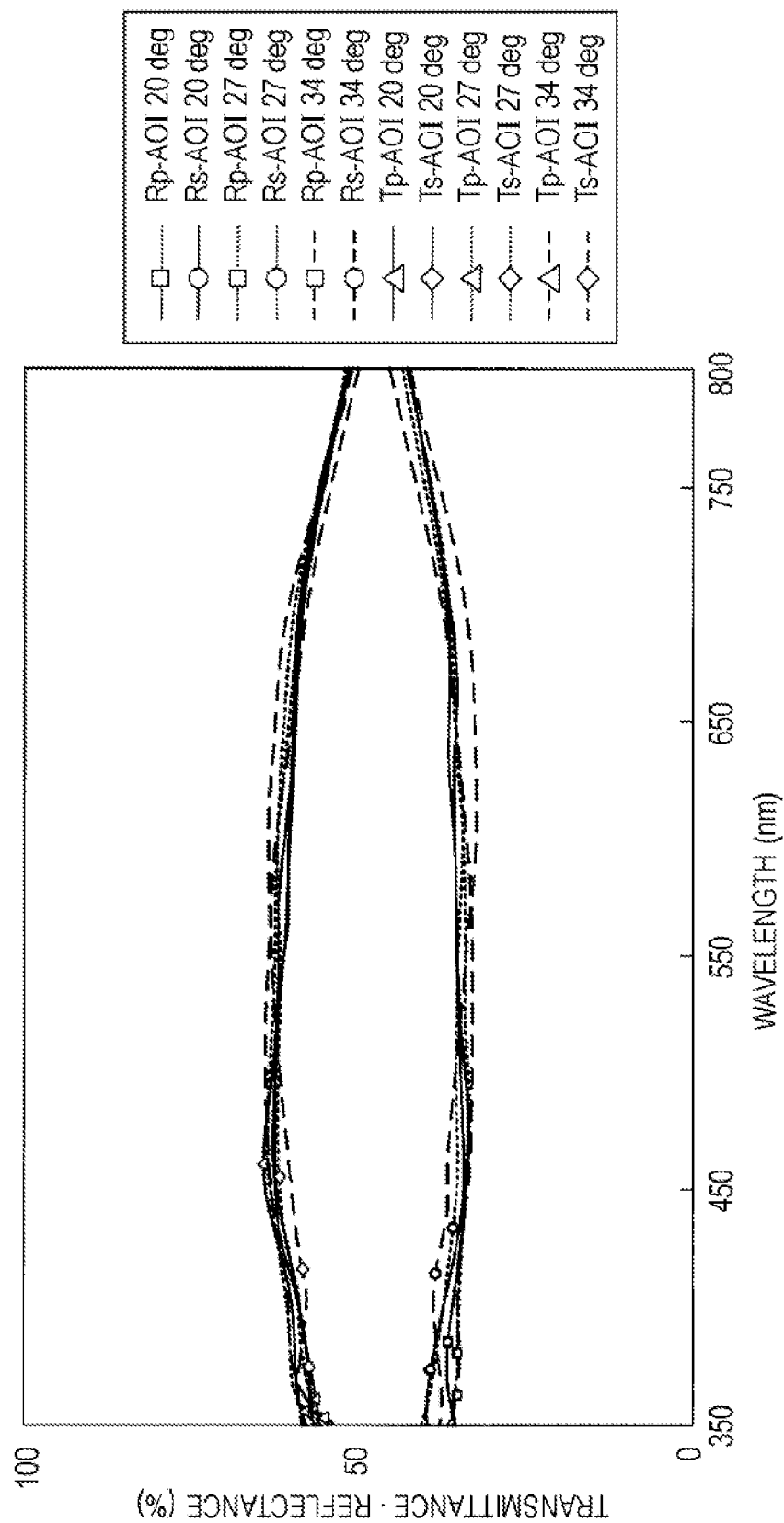
FIG. 4 is a graph illustrating a relationship of a refractive index R of a half mirror having a film configuration of Example 2 with a spectral transmittance T at an incident angle of 20 to 34°.

FIG. 4 is a graph illustrating a relationship of a refractive index R of a half mirror having the film configuration of Example 2 with a spectral transmittance T at an incident angle of 20 to 34°. FIG. 4 demonstrates that Example 2 provided flat spectral characteristics at a wavelength from 400 to 660 nm within a visible light range and exhibited a reflectance of 64.0%, a transmittance of 34.5%, and optical absorption of 1.5% at a wavelength of 550 nm, which indicates that the half mirror exhibited low optical absorption and had excellent optical characteristics.

In Example 2, the metallic film 40 composed of Ag was covered with the high-refractive-index layers 41a composed of $ZrO_2$, so that a high refractive index was able to be secured. Furthermore, the block layers 41b each including the $SiO_2$ layer and the $Al_2O_3$ layer were able to sufficiently secure the distances between the resin substrates 11 and the metallic film 40 and between the resin substrates 12 and the metallic film 40, respectively, which was able to prevent a reduction in the density of the dielectric films 41 with the metallic layer 40 interposed therebetween, the reduction in the density of the dielectric films 41 being caused by leakage of moisture and organic components from the resin substrates 11 and 12 and the subsequent volatilization thereof during film formation.

Example 3

The resin substrates 11 and 12 were formed from acrylic resin (refractive index n=1.50), and 5 layers were formed from materials shown in Table 3 so as to have refractive indexes and thicknesses shown in Table 3.

TABLE 3

| Substrate: acrylic resin (n = 1.50) Angle of incident light: 20 to 34° | | | |
|---|---|---|---|
| Layer | Material | Refractive index | Thickness (nm) |
| 1 | Al2O3 | 1.57 | 194.0 |
| 2 | ZrO2 | 2.02 | 85.8 |
| 3 | Ag | 0.06 | 17.4 |
| 4 | ZrO2 | 2.02 | 48.7 |
| 5 | Al2O3 | 1.57 | 296.3 |
| Total: | | | 642.1 |

As shown in Table 3, in Example 3, the metallic film 40 (third layer) was an Ag film having a refractive index of 0.06 and a thickness of 17.4 nm, and the high-refractive-index layers 41a (second and fourth layers) were formed from $ZrO_2$ such that the metallic film 40 was disposed therebetween. Furthermore, $Al_2O_3$ layers (first and fifth layers) were formed as the block layers 41b such that the above laminate was disposed therebetween.

The $Al_2O_3$ layers as the block layers 41b had a thickness of not less than 5 nm, and the pair of dielectric films 41 had a thickness ranging from 200 nm to 1 μm. In other words, the total thickness of the first and second layers and the total thickness of the fourth and fifth layers were in the range of 200 nm to 1 μm.

Figure 5:
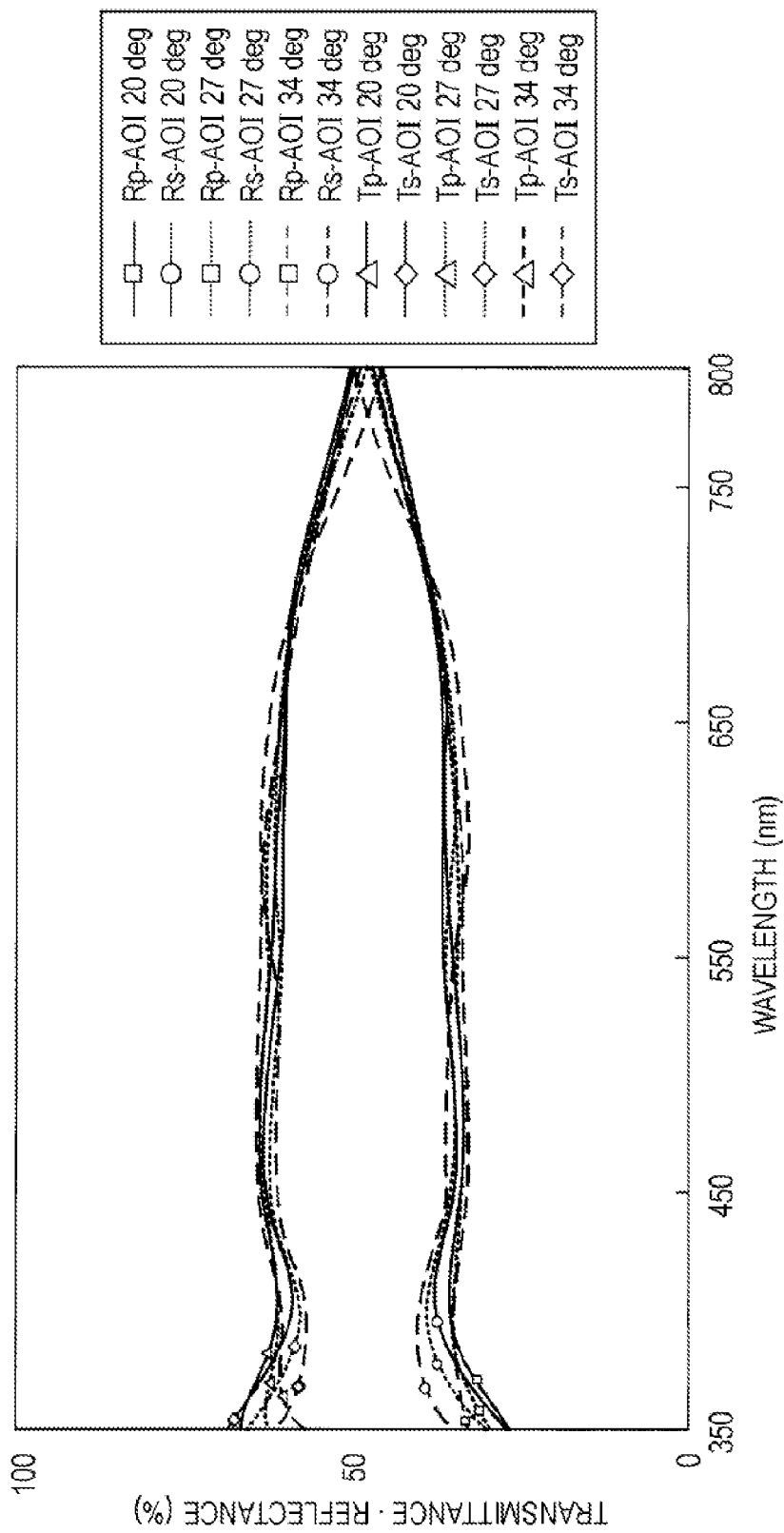
FIG. 5 is a graph illustrating a relationship of a refractive index R of a half mirror having a film configuration of Example 3 with a spectral transmittance T at an incident angle of 20 to 34°.

FIG. 5 is a graph illustrating a relationship of a refractive index R of a half mirror having the film configuration of Example 3 with a spectral transmittance T at an incident angle of 20 to 34°. FIG. 5 demonstrates that Example 3 provided flat spectral characteristics at a wavelength from 400 to 660 nm within a visible light range and exhibited a reflectance of 64.0%, a transmittance of 35.5%, and optical absorption of 0.5% at a wavelength of 550 nm, which indicates that the half mirror exhibited low optical absorption and had excellent optical characteristics.

In Example 3, the metallic film 40 composed of Ag was covered with the high-refractive-index layers 41a composed of $ZrO_2$, so that a high refractive index was able to be secured. Furthermore, the block layers 41b composed of $Al_2O_3$ were able to sufficiently secure the distances between the resin substrate 11 and the metallic film 40 and between the resin substrate 12 and the metallic film 40, respectively, which was able to prevent a reduction in the density of the dielectric films 41 with the metallic layer 40 interposed therebetween, the reduction in the density of the dielectric films 41 being caused by leakage of moisture and organic components from the resin substrates 11 and 12 and the subsequent volatilization thereof during film formation.

Example 4

The resin substrates 11 and 12 were formed from acrylic resin (refractive index n=1.50), and 10 layers were formed from materials shown in Table 4 so as to have refractive indexes and thicknesses shown in Table 4.

TABLE 4

| Substrate: acrylic resin (n = 1.50) Angle of incident light: 20 to 34° | | | |
|---|---|---|---|
| Layer | Material | Refractive index | Thickness (nm) |
| 1 | ZrO2 | 2.02 | 8.9 |
| 2 | SiO2 | 1.46 | 202.2 |
| 3 | ZrO2 | 2.02 | 50.2 |
| 4 | Al2O3 | 1.57 | 17.5 |
| 5 | Ag | 0.06 | 17.3 |
| 6 | Al2O3 | 1.57 | 17.5 |
| 7 | ZrO2 | 2.02 | 30.2 |
| 8 | SiO2 | 1.46 | 541.0 |
| 9 | Al2O3 | 1.57 | 21.4 |
| 10 | SiO2 | 1.46 | 52.8 |
| Total: | | | 959.0 |

As shown in Table 4, in Example 4, the metallic film 40 (fifth layer) was an Ag film having a refractive index of 0.06 and a thickness of 17.3 nm, and the high-refractive-index layers 41a (fourth and sixth layers) were formed from $Al_2O_3$ such that the metallic film 40 was disposed therebetween. Furthermore, $ZrO_2$ layers were formed (third and seventh layers) such that the above laminate was disposed therebetween, and $SiO_2$ layers (second and eighth layers) were formed such that the resulting laminate was disposed therebetween, thereby forming the block layers 41b. Moreover, in Example 4, the protective layers 41c were formed such that the block layers 41b were interposed therebetween. One of the protective films 41c was a single layer (first layer) composed of $ZrO_2$ and contacting one resin substrate, and the other one was a multilayer (ninth and tenth layers) including an $SiO_2$ layer contacting the other substrate and an $Al_2O_3$ layer covering the $SiO_2$ layer.

The $Al_2O_3$ layers as the high-refractive-index layers 41a had a thickness of not less than 5 nm, and the pair of dielectric films 41 had a thickness ranging from 200 nm to 1 μm. In other words, the total thickness of the first to fourth layers and the total thickness of the sixth to tenth layers were in the range of 200 nm to 1 μm.

Figure 6:
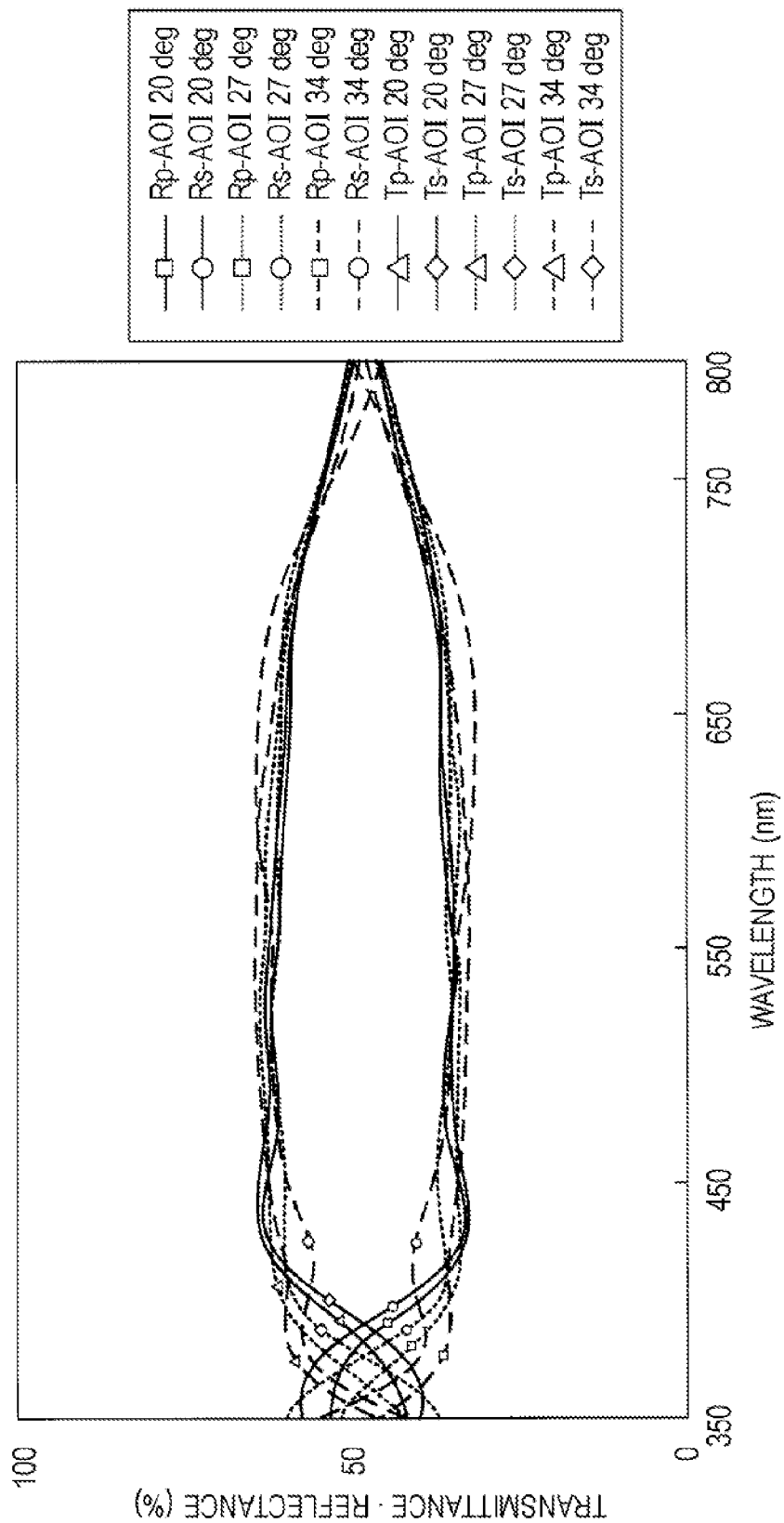
FIG. 6 is a graph illustrating a relationship of a refractive index R of a half mirror having a film configuration of Example 4 with a spectral transmittance T at an incident angle of 20 to 34°.

FIG. 6 is a graph illustrating a relationship of a refractive index R of a half mirror having the film configuration of Example 4 with a spectral transmittance T at an incident angle of 20 to 34°. FIG. 6 demonstrates that Example 4 provided flat spectral characteristics at a wavelength from 400 to 660 nm within a visible light range and exhibited a reflectance of 64.0%, a transmittance of 34.0%, and optical absorption of 3.0% at a wavelength of 550 nm, which indicates that the half mirror exhibited low optical absorption and had excellent optical characteristics.

In Example 4, the metallic film 40 composed of Ag was covered with the high-refractive-index layers 41a composed of $Al_2O_3$, so that a high refractive index was able to be secured. Furthermore, the block layers 41b each including the $SiO_2$ layer and the $ZrO_2$ layer were able to sufficiently secure the distances between the resin substrates 11 and the metallic film 40 and between the resin substrates 12 and the metallic film 40, respectively. The protective films 41c formed from $ZrO_2$ and formed by laminating $Al_2O_3$ and $SiO_2$ were additionally provided on the side of the resin substrates 11 and 12, respectively, which was able to secure a further appropriate refractive index and transmittance and further steadily prevent the resin substrates 11 and 12 from typically degrading the metallic film 40. In particular, the $ZrO_2$ layer and the $SiO_2$ layer which were highly adhesive to resin directly contacted the resin substrates 11 and 12, respectively, which was able to prevent a reduction in the density of the dielectric films 41 with the metallic layer 40 interposed therebetween, the reduction in the density of the dielectric films 41 being caused by leakage of moisture and organic components from the resin substrates 11 and 12 and the subsequent volatilization thereof during film formation.

Example 5

The resin substrates 11 and 12 were formed from acrylic resin (refractive index n=1.50), and 7 layers were formed from materials shown in Table 5 so as to have refractive indexes and thicknesses shown in Table 5.

TABLE 5

Substrate: acrylic resin (n = 1.50)
Angle of incident light: 20 to 34°

| Layer | Material | Refractive index | Thickness (nm) |
|---|---|---|---|
| 1 | $SiO_2$ | 1.46 | 162.2 |
| 2 | $ZrO_2$ | 2.02 | 52.2 |
| 3 | $Al_2O_3$ | 1.57 | 17.5 |
| 4 | Ag | 0.06 | 17.0 |
| 5 | $Al_2O_3$ | 1.57 | 17.5 |
| 6 | $ZrO_2$ | 2.02 | 25.5 |
| 7 | $SiO_2$ | 1.46 | 215.5 |
| Total: | | | 507.4 |

As shown in Table 5, in Example 5, the metallic film 40 (fourth layer) was an Ag film having a refractive index of 0.06 and a thickness of 17.0 nm, and the high-refractive-index layers 41a (third and fifth layers) were formed from $Al_2O_3$ such that the metallic film 40 was disposed therebetween. Furthermore, $ZrO_2$ layers (second and sixth layers) were formed such that the above laminate was disposed therebetween, and then $SiO_2$ layers (first and seventh layers) were formed such that the resulting laminate was disposed therebetween, thereby forming the block layers 41b.

The $Al_2O_3$ layers as the high-refractive-index layers 41a had a thickness of not less than 5 nm, and the pair of dielectric films 41 had a thickness ranging from 200 nm to 1 μm. In other words, the total thickness of the first to third layers and the total thickness of the fifth to seventh layers were in the range of 200 nm to 1 μm.

Figure 7:
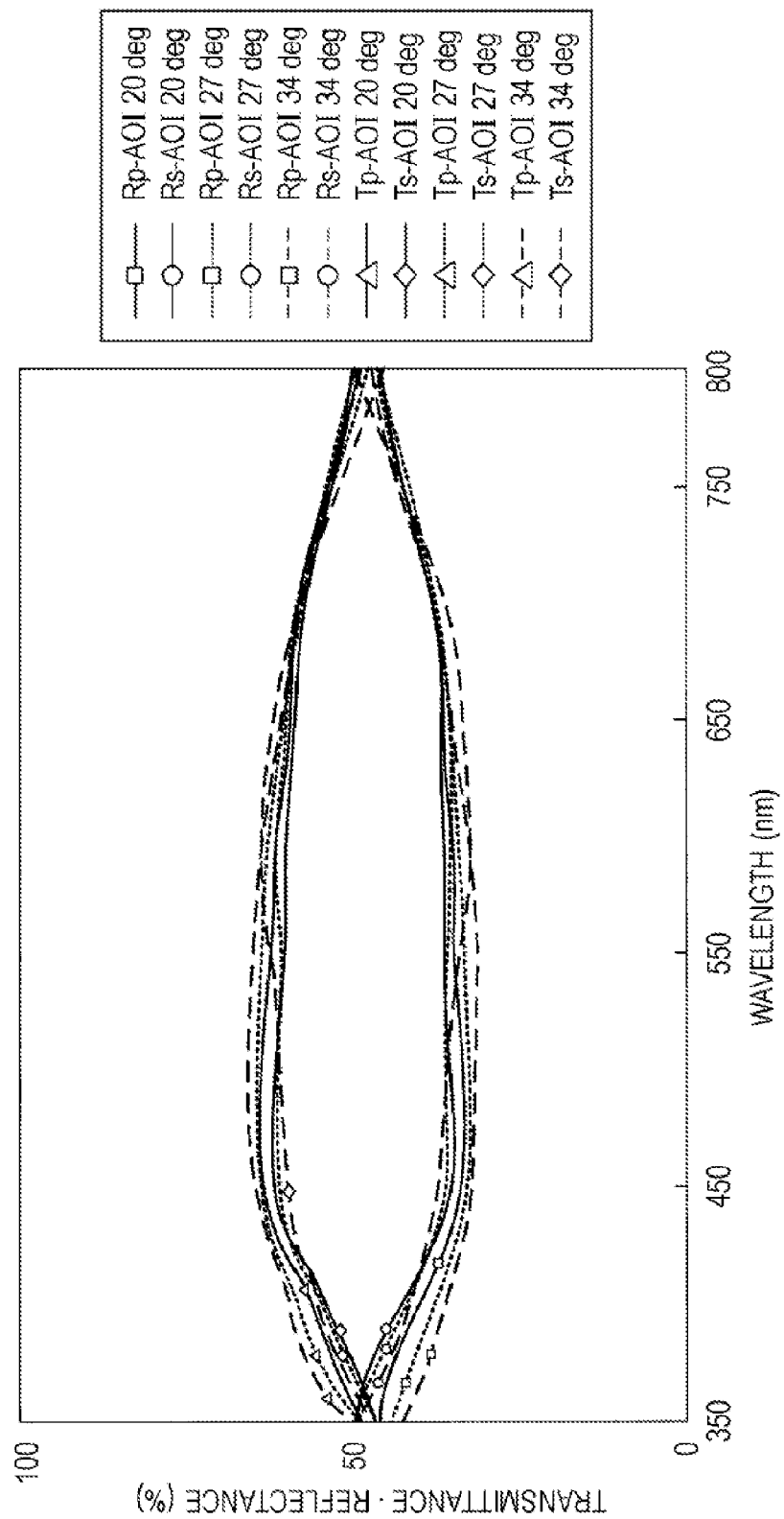
FIG. 7 is a graph illustrating a relationship of a refractive index R of a half mirror having a film configuration of Example 5 with a spectral transmittance T at an incident angle of 20 to 34°.

FIG. 7 is a graph illustrating a relationship of a refractive index R of a half mirror having the film configuration of Example 5 with a spectral transmittance T at an incident angle of 20 to 34°. FIG. 7 demonstrates that Example 5 provided flat spectral characteristics at a wavelength from 400 to 660 nm within a visible light range and exhibited a reflectance of 63.5%, a transmittance of 35.5%, and optical absorption of 1.0% at a wavelength of 550 nm, which indicates that the half mirror exhibited low optical absorption and had excellent optical characteristics.

In Example 5, the metallic film 40 composed of Ag was covered with the high-refractive-index layers 41a composed of $Al_2O_3$, so that a high refractive index was able to be secured. Furthermore, the block layers 41b each including the $SiO_2$ layer and the $ZrO_2$ layer were able to sufficiently secure the distances between the resin substrates 11 and the metallic film 40 and between the resin substrates 12 and the metallic film 40, respectively, which was able to prevent a reduction in the density of the dielectric films 41 with the metallic layer 40 interposed therebetween, the reduction in the density of the dielectric films 41 being caused by leakage of moisture and organic components from the resin substrates 11 and 12 and the subsequent volatilization thereof during film formation.

Example 6

The different film configurations of Examples 1 to 5 may be separately provided at the upper side and the lower side of the metallic film 40 to adjust reflectance and transmittance of the entire film configuration depending on an image displayed by an image display apparatus and an incident direction or emission direction of external light.

Table 6 shows the film configuration of Example 6. The film configuration of Example 5 was provided as a first dielectric film 41 at the upper side of the metallic film 40, and the film configuration of Example 3 was provided as a second dielectric film 41 at the lower side of the metallic film 40. In particular, the resin substrates 11 and 12 were formed from acrylic resin (refractive index n=1.50), and 6 layers were formed from materials shown in Table 6 so as to have refractive indexes and thicknesses shown in Table 6.

TABLE 6

Substrate: acrylic resin (n = 1.50)
Angle of incident light: 20 to 34°

| Layer | Material | Refractive index | Thickness (nm) |
|---|---|---|---|
| 1 | $SiO_2$ | 1.46 | 218.2 |
| 2 | $ZrO_2$ | 2.02 | 32.1 |
| 3 | $Al_2O_3$ | 1.57 | 17.5 |
| 4 | Ag | 0.06 | 16.9 |
| 5 | $ZrO_2$ | 2.02 | 80.6 |
| 6 | $Al_2O_3$ | 1.57 | 204.4 |
| Total: | | | 569.6 |

As shown in Table 6, in Example 6, the metallic film 40 (fourth layer) was an Ag film having a refractive index of 0.06 and a thickness of 16.9 nm, and the first dielectric film 41 was formed at the upper side (top side) of the metallic film 40. The first dielectric film 41 included the high-refractive-index layer 41a (third layer) formed from $Al_2O_3$ so as to cover the metallic layer 40 and the block layer 41b including a $ZrO_2$ layer (second layer) formed so as to cover the high-refractive-index layer 41a and an $SiO_2$ layer (first layer) formed so as to cover the $ZrO_2$ layer.

On the other hand, the second dielectric film 41 was formed at the lower side (bottom side) of the metallic film 40, the second dielectric film 41 including the high-refractive-index layer 41a (fifth layer) formed from $ZrO_2$ so as to cover the metallic layer 40 (third layer) and the block layer 41b (sixth layer) formed from $Al_2O_3$ so as to cover this high-refractive-index layer 41a.

The $Al_2O_3$ layers being the high-refractive-index layer 41a of the first dielectric film 41 and the block layer 41b of the second dielectric film 41 had a thickness of not less than 5 nm, and the first and second dielectric films 41 had a thickness ranging from 200 nm to 1 µm. In other words, the total thickness of the first to third layers and the total thickness of the fifth and sixth layers were in the range of 200 nm to 1 µm. The first and second dielectric films 41 may further include the protective films provided in other examples to produce a film configuration including 8 to 10 layers.

Figure 8:
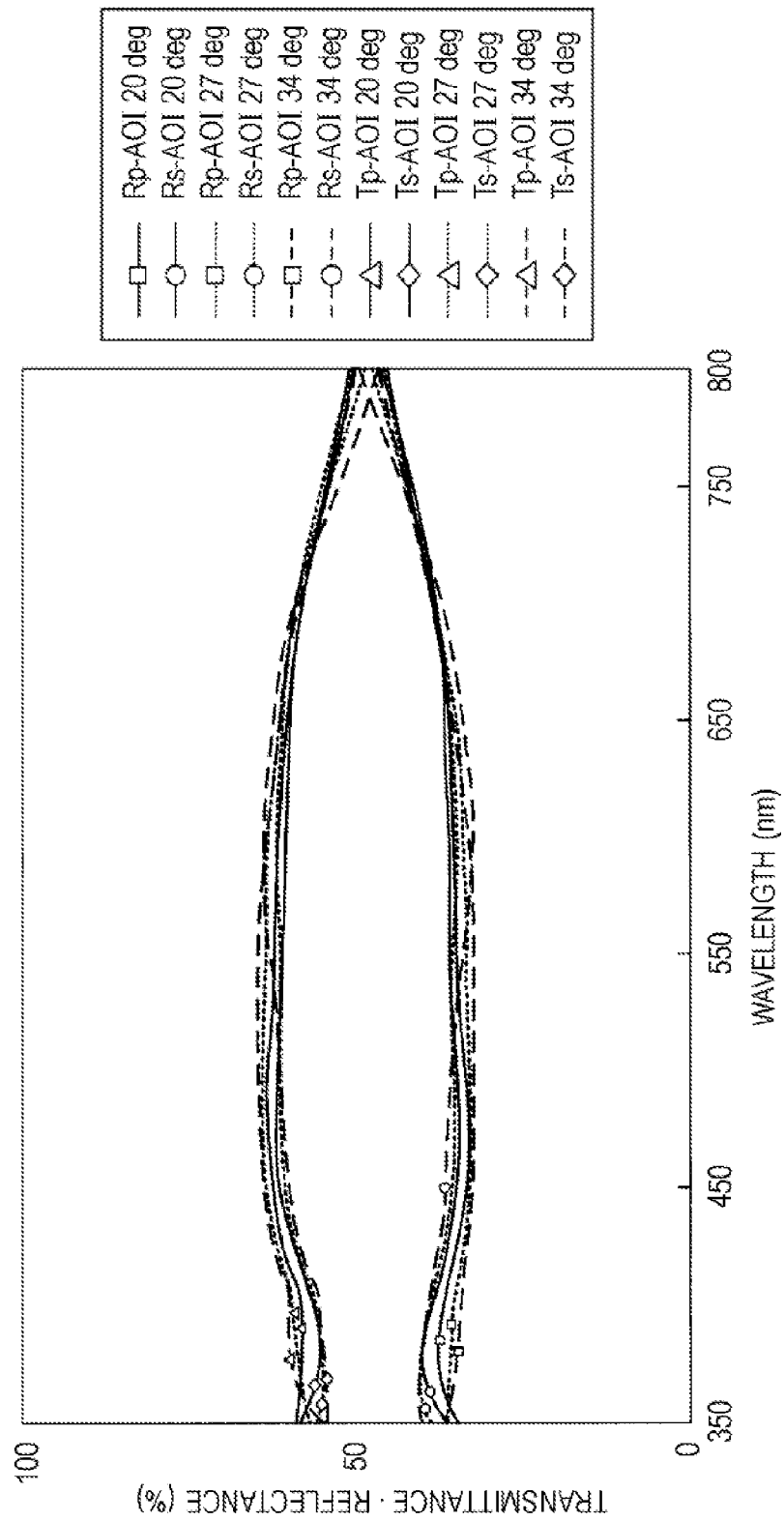
FIG. 8 is a graph illustrating a relationship of a refractive index R of a half mirror having a film configuration of Example 6 with a spectral transmittance T at an incident angle of 20 to 34°.

FIG. 8 is a graph illustrating a relationship of a refractive index R of a half mirror having the film configuration of Example 6 with a spectral transmittance T at an incident angle of 20 to 34°. FIG. 8 demonstrates that Example 6 provided flat spectral characteristics at a wavelength from 400 to 660 nm within a visible light range and exhibited a reflectance of 63.0%, a transmittance of 36.0%, and optical absorption of 1.0% at a wavelength of 550 nm, which indicates that the half mirror exhibited low optical absorption and had excellent optical characteristics.

In Example 6, the metallic film composed of Ag was covered with the high-refractive-index layers 41a composed of $ZrO_2$ and $Al_2O_3$, respectively, so that a high refractive index was able to be secured. Furthermore, the block layers formed from $Al_2O_3$ and formed by laminating $ZrO_2$ and $SiO_2$, respectively, were able to sufficiently secure the distances between the resin substrate 12 and the metallic film 40 and between the resin substrate 11 and the metallic film 40, respectively, which was able to secure further appropriate reflectance and transmittance and further steadily prevent the resin substrates 11 and 12 from typically degrading the metallic film 40. In particular, the $Al_2O_3$ layer and the $SiO_2$ layer which were highly adhesive to resin directly contacted the resin substrates 11 and 12, respectively, which was able to prevent a reduction in the density of the dielectric films 41 with the metallic layer 40 interposed therebetween, the reduction in the density of the dielectric films 41 being caused by leakage of moisture and organic components from the resin substrates 11 and 12 and the subsequent volatilization thereof during film formation.

Examples mentioned above have been described to exemplify the invention. The invention should not be therefore limited to Examples described above and can be variously modified within the scope of the invention, for example, in response to design requirement. In the embodiment described above, although the head mount display has been described to exemplify the image display apparatus, the invention may employ any other configuration which enables an image displayed on a display device, such as a liquid crystal display device, to be observed through the half mirror, such as head up displays and viewfinders of image-recording apparatuses, e.g., camcorders.

The entire disclosure of Japanese Patent Application No. 2011-256682, filed Nov. 24, 2011 is expressly incorporated by reference herein.

What is claimed is:

1. An image display apparatus comprising:
a display device that displays an image; and
a half mirror, the half mirror comprising:
   a first resin substrate and a second resin substrate formed from translucent resin;
   a metallic film at least containing Ag and disposed between the first resin substrate and the second resin substrate; and
   a first dielectric film disposed between the metallic film and the first resin substrate, wherein
   the first dielectric film includes a first high-refractive-index layer and a first block layer,
   the first high-refractive-index layer is composed of $ZrO_2$ and configured so as to contact the metallic film,
   the first block layer is disposed between the first high-refractive-index layer and the first resin substrate,
   the first block layer is composed of an $Al_2O_3$ layer,
   the $Al_2O_3$ layer of the first block layer has a thickness of not less than 5 nm,
   the first dielectric film has a thickness ranging from 200 nm to 1 µm, and
   the half mirror transmits external light and reflects the image displayed on the display device to show the external light and the image combined with each other.

2. An image display apparatus comprising:
a display device that displays an image; and
a half mirror, the half mirror comprising:
   a first resin substrate and a second resin substrate formed from translucent resin;
   a metallic film at least containing Ag and disposed between the first resin substrate and the second resin substrate; and
   a first dielectric film disposed between the metallic film and the first resin substrate, wherein
   the first dielectric film includes a first high-refractive-index layer and a first block layer,
   the first high-refractive-index layer is composed of any one of an alloy of Zr and Ti and mixed oxide containing Zr and Ti and configured so as to contact the metallic film,
   the first block layer is disposed between the first high-refractive-index layer and the first resin substrate,
   the first block layer is composed of an $Al_2O_3$ layer,
   the $Al_2O_3$ layer of the first block layer has a thickness of not less than 5 nm,
   the first dielectric film has a thickness ranging from 200 nm to 1 µm, and
the half mirror transmits external light and reflects the image displayed on the display device to show the external light and the image combined with each other.

3. An image display apparatus comprising:
a display device that displays an image; and
a half mirror, the half mirror comprising:
   a resin substrate formed from translucent resin;
   a metallic film at least containing Ag; and
   a dielectric film disposed between the metallic film and the resin substrate, wherein
   the dielectric film includes a high-refractive-index layer and a block layer,
   the high-refractive-index layer is composed of any one of $ZrO_2$, an alloy of Zr and Ti, and mixed oxide containing Zr and Ti and configured so as to contact the metallic film,
   the block layer is disposed between the first high-refractive-index layer and the resin substrate,
   the block layer is composed of an $Al_2O_3$ layer,
   the $Al_2O_3$ layer of the block layer has a thickness of not less than 5 nm,
   the dielectric film has a thickness ranging from 200 nm to 1 µm, and the half mirror transmits external light and reflects the image displayed on the display device to show the external light and the image combined with each other.

4. The image display apparatus according to claim 1, wherein the metallic film comprises an alloy of Ag and at least one of Cu, Au, and Pd.

5. The image display apparatus according to claim 1, wherein
the first dielectric film further includes a second block layer,
the second block layer is disposed between the first block layer and the first resin substrate, and
the second block layer is composed of $SiO_2$.

6. The image display apparatus according to claim 1, wherein
the half mirror further comprises a second dielectric film disposed between the metallic film and the second resin substrate,
the second dielectric film includes a second high-refractive-index layer and a third block layer,
the second high-refractive-index layer is disposed between the metallic layer and the second resin substrate, is composed of $ZrO_2$, and is configured so as to contact the metallic film,
the third block layer is disposed between the second high-refractive-index layer and the second resin substrate, and
the third block layer is and is composed of $Al_2O_3$.

7. The image display apparatus according to claim 2, wherein the metallic film comprises an alloy of Ag and at least one of Cu, Au, and Pd.

8. The image display apparatus according to claim 2, wherein
the first dielectric film further includes a second block layer,
the second block layer is disposed between the first block layer and the first resin substrate, and
the second block layer is composed of $SiO_2$.

9. The image display apparatus according to claim 2, wherein
the half mirror further comprises a second dielectric film disposed between the metallic film and the second resin substrate,
the second dielectric film includes a second high-refractive-index layer and a third block layer,
the second high-refractive-index layer is disposed between the metallic layer and the second resin substrate, is composed of any one of an alloy of Zr and Ti and mixed oxide containing Zr and Ti, and is configured so as to contact the metallic film,
the third block layer is disposed between the second high-refractive-index layer and the second resin substrate, and
the third block layer is composed of $Al_2O_3$.

10. The image display apparatus according to claim 5, wherein
the first dielectric film further includes a first protective layer,
the first protective layer is disposed between the second block layer and the first resin substrate, and
the first protective layer is composed of $ZrO_2$.

11. The image display apparatus according to claim 6, wherein
the second dielectric film further includes a fourth block layer,
the fourth block layer is disposed between the third block layer and the second resin substrate, and
the fourth block layer is composed of $SiO_2$.

12. The image display apparatus according to claim 8, wherein
the first dielectric film further includes a first protective layer,
the first protective layer is disposed between the second block layer and the first resin substrate, and
the first protective layer is composed of $ZrO_2$.

13. The image display apparatus according to claim 9, wherein
the second dielectric film further includes a fourth block layer,
the fourth block layer is disposed between the third block layer and the second resin substrate, and
the fourth block layer is composed of $SiO_2$.

14. The image display apparatus according to claim 11, wherein
the second dielectric film further includes a second protective layer,
the second protective layer is disposed between the fourth block layer and the second resin substrate, and
the second protective layer is composed of at least one of $Al_2O_3$ and $SiO_2$.

15. The image display apparatus according to claim 13, wherein
the second dielectric film further includes a second protective layer,
the second protective layer is disposed between the fourth block layer and the second resin substrate, and
the second protective layer is composed of at least one of $Al_2O_3$ and $SiO_2$.

* * * * *